(12) United States Patent
Matsuda

(10) Patent No.: US 9,110,649 B2
(45) Date of Patent: Aug. 18, 2015

(54) STORAGE APPARATUS, CONTROL APPARATUS AND CONTROL METHOD

(71) Applicant: FUJITSU LIMITED, Kawasaki-shi, Kanagawa (JP)

(72) Inventor: Shinnosuke Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 13/925,137

(22) Filed: Jun. 24, 2013

(65) Prior Publication Data

US 2013/0283069 A1    Oct. 24, 2013

Related U.S. Application Data

(63) Continuation of application No. PCT/JP2010/073406, filed on Dec. 24, 2010.

(51) Int. Cl.
*G06F 1/26* (2006.01)

(52) U.S. Cl.
CPC . *G06F 1/26* (2013.01); *G06F 1/263* (2013.01)

(58) Field of Classification Search
None
See application file for complete search history.

(56) References Cited

U.S. PATENT DOCUMENTS

| | | | |
|---|---|---|---|
| 7,602,147 | B2 | 10/2009 | Katzenberger |
| 2006/0244459 | A1 | 11/2006 | Katzenberger |
| 2008/0250256 | A1 | 10/2008 | Hagiwara |
| 2010/0008174 | A1* | 1/2010 | Sartore et al. ............... 365/228 |

FOREIGN PATENT DOCUMENTS

| | | |
|---|---|---|
| EP | 2 249 243 A1 | 11/2010 |
| JP | 2001-337789 | 12/2001 |
| JP | 2005-39873 | 2/2005 |
| JP | 2005-91624 | 4/2005 |
| JP | 2007-282461 | 10/2007 |
| JP | 2008-257650 | 10/2008 |
| JP | 2006-314192 | 11/2008 |
| JP | 2009-65751 | 3/2009 |
| JP | 2009-186908 | 8/2009 |
| WO | 2009/098776 | 8/2009 |

OTHER PUBLICATIONS

International Search Report mailed Apr. 12, 2011 for corresponding International Application No. PCT/JP2010/073406.
Office Action mailed May 27, 2014 in corresponding Japanese Patent Application No. 2012-549557.

* cited by examiner

*Primary Examiner* — Kim Huynh
*Assistant Examiner* — Vincent Chang
(74) *Attorney, Agent, or Firm* — Staas & Halsey LLP

(57) ABSTRACT

A storage apparatus that includes a power supply unit that supplies power to a controller when power supply from the outside to a storage apparatus stops, a surplus power determination unit that determines surplus power that is power, which is to be supplied by the power supply unit and by which power for the saving of data into a nonvolatile memory is exceeded, a target voltage determination unit that determines a first target voltage based on the surplus power, and a charging processing unit that carries out a charging process for the power supply unit with a first current value until the first target voltage reached and that carries out a charging process for the power supply unit with a second current value lower than the first current value until a second target voltage higher than the first target voltage is reached from the first target voltage.

14 Claims, 11 Drawing Sheets

FIG. 6

| CHARGE MODE | | FIRST MODE (VERY FAST) | SECOND MODE (FAST) | THIRD MODE (NORMAL) | FOURTH MODE (SLOW) |
|---|---|---|---|---|---|
| CONDITION | ELAPSED TIME AFTER FABRICATION | EQUAL TO OR SHORTER THAN 60 MONTHS | EQUAL TO OR SHORTER THAN 60 MONTHS | LONGER THAN 60 MONTHS | LONGER THAN 60 MONTHS |
| | SURPLUS POWER | EQUAL TO OR HIGHER THAN 30 % | EQUAL TO OR HIGHER THAN 20 % BUT LOWER THAN 30 % | EQUAL TO OR HIGHER THAN 10 % | LOWER THAN 10 % |
| | | | | LOWER THAN 20 % | |

STORAGE APPARATUS, CONTROL APPARATUS AND CONTROL METHOD

CROSS-REFERENCE TO RELATED APPLICATIONS

This application is a Continuation Application of a PCT international Application No. {PCT/JP2010/073406}, filed on Dec. 24, 2010, the entire contents of which are incorporated herein by reference.

FIELD

The embodiment discussed herein is directed to a storage apparatus, a control apparatus and a control method.

BACKGROUND

It is known that, in a storage apparatus such as an RAID (Redundant Array of Inexpensive Disks) apparatus, data recorded in a volatile memory is saved into a nonvolatile memory using power supplied from a capacitor when power supply to a storage apparatus stops (upon power failure).

A capacitor such as an electric double layer capacitor suffers from decrease of the capacitance and increase of the direct current resistance by time-dependent deterioration thereof. Therefore, it is known that power which can be supplied by an electric double layer capacitor decreases by time-dependent deterioration.

[Patent Document 1] International Publication No. 2009/098776

[Patent Document 2] Japanese Laid-Open Patent Publication No. 2005-39873

Generally, an SCU (System Capacitor Unit) that includes an electric double layer capacitor is designed such that power required for saving data recorded in a volatile memory such as a cache memory into a nonvolatile memory is maintained when the product life cycle is exhausted after several years (for example, five years) from its fabrication. In particular, the SCU at an initial stage after the fabrication keeps power that assumes a drop of power, which can be supplied from the electric double layer capacitor, by time-dependent deterioration. Therefore, the SCU keeps surplus power that exceeds power required for saving data recorded in a cache memory into a nonvolatile memory.

Accordingly, since charging time is required also for surplus power when the electric double layer capacitor included in the SCU is charged upon start-up of the storage apparatus, it takes time to start-up the storage apparatus.

SUMMARY OF THE INVENTION

According to the present disclosure, there is provided a storage apparatus that includes a storage unit that stores data and a controller that carries out data storage control for the storage unit, including a power supply unit that supplies power to the controller when power supply from the outside to the storage apparatus stops (hereinafter referred to as upon power failure), a cache memory that retains data to be stored into the storage unit, a nonvolatile memory into which the data retained in the cache memory is saved upon power failure, a surplus power determination unit that determines surplus power that is power, which is to be supplied by the power supply unit and by which power for the saving of data into the nonvolatile memory is exceeded, a target voltage determination unit that determines a first target voltage that is a target in a charging process to the power supply unit based on the surplus power determined by the surplus power determination unit, and a charging processing unit that carries out a charging process for the power supply unit with a first current value until the voltage charged in the power supply unit reaches the first target voltage and that carries out a charging process for the power supply unit with a second current value lower than the first current value until the voltage charged in the power supply unit reaches a second target voltage higher than the first target voltage from the first target voltage.

According to the present disclosure, there is further provided a control apparatus that carries out data storage control for a storage unit that stores data, including a power supply unit that supplies power to the control apparatus when power supply from the outside to the storage unit stops (hereinafter referred to as upon power failure), a cache memory that retains data to be stored into the storage unit, a nonvolatile memory into which the data retained in the cache memory is saved upon power failure, a surplus power determination unit that determines surplus power that is power, which is to be supplied by the power supply unit and by which power for the saving of data into the nonvolatile memory is exceeded, a target voltage determination unit that determines a first target voltage that is a target in a charging process to the power supply unit based on the surplus power determined by the surplus power determination unit, and a charging processing unit that carries out a charging process for the power supply unit with a first current value until the voltage charged in the power supply unit reaches the first target voltage and that carries out a charging process for the power supply unit with a second current value lower than the first current value until the voltage charged in the power supply unit reaches a second target voltage higher than the first target voltage from the first target voltage.

According to the present disclosure, also there is provided a control method for a storage apparatus that includes a storage unit that stores data, a controller that carries out data storage control for the storage unit, a power supply unit that supplies power to the controller when power supply from the outside to the storage apparatus stops (hereinafter referred to as upon power failure), a cache memory that retains data to be stored into the storage unit, and a nonvolatile memory into which the data retained in the cache memory is saved upon power failure, the control method including determining surplus power that is power, which is to be supplied by the power supply unit and by which power for the saving of data into the nonvolatile memory is exceeded, determining a first target voltage that is a target in a charging process to the power supply unit based on the determined surplus power, and carrying out a charging process for the power supply unit with a first current value until the voltage charged in the power supply unit reaches the first target voltage and that carries out a charging process for the power supply unit with a second current value lower than the first current value until the voltage charged in the power supply unit reaches a second target voltage higher than the first target voltage from the first target voltage.

The object and advantages of the invention will be realized and attained by means of the elements and combinations particularly pointed out in the claims.

It is to be understood that both the foregoing general description and the following detailed description are exemplary and explanatory and are not restrictive of the invention

BRIEF DESCRIPTION OF THE DRAWINGS

FIG. 6 is a view depicting a charge mode as the example of the embodiment;

DESCRIPTION OF EMBODIMENT

In the following, an example of an embodiment of a storage apparatus, a control apparatus and a control method is described with reference to the drawings.

Figure 1:
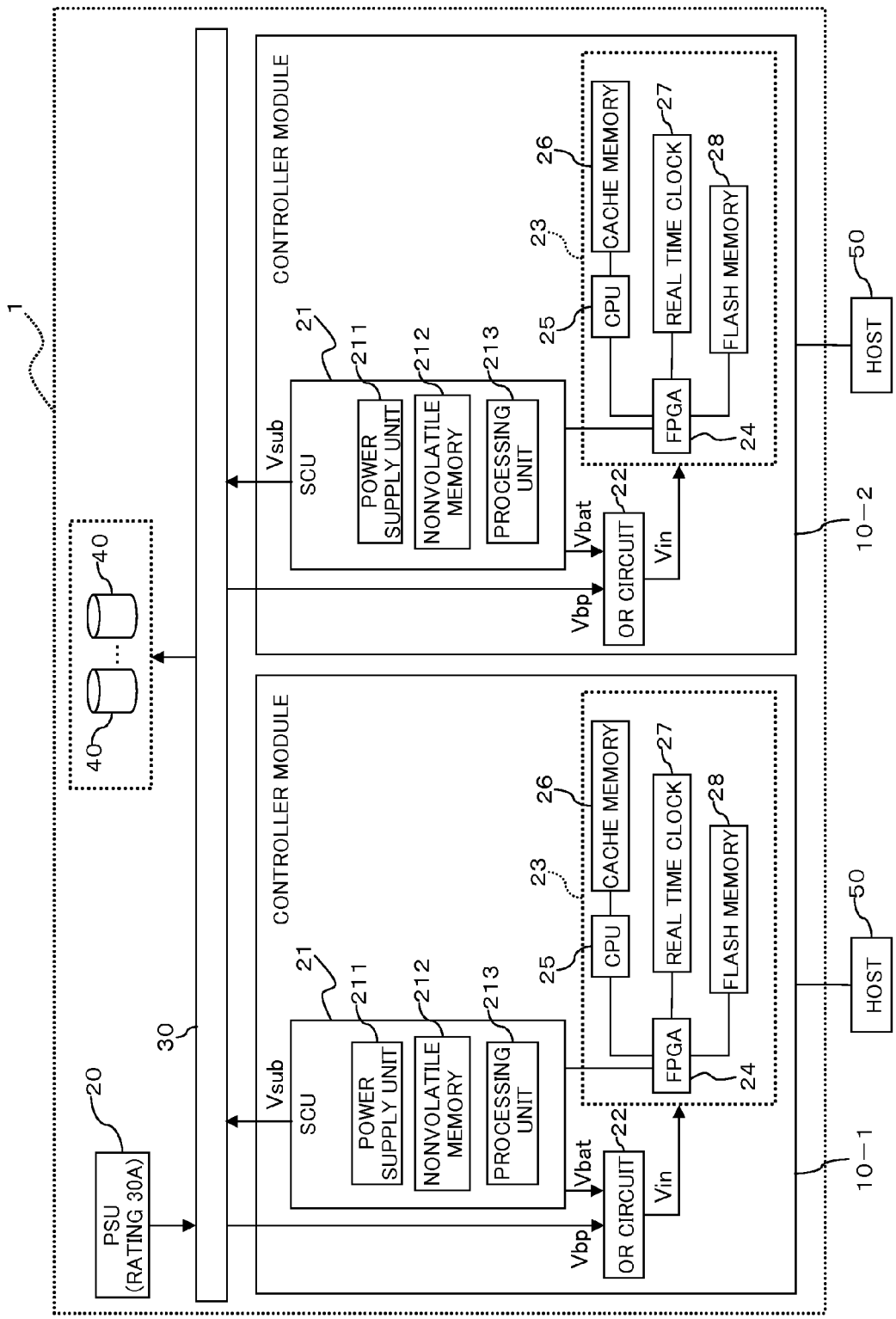
FIG. 1 is a schematic view depicting a configuration of a storage apparatus as an example of an embodiment.
Figure 2:
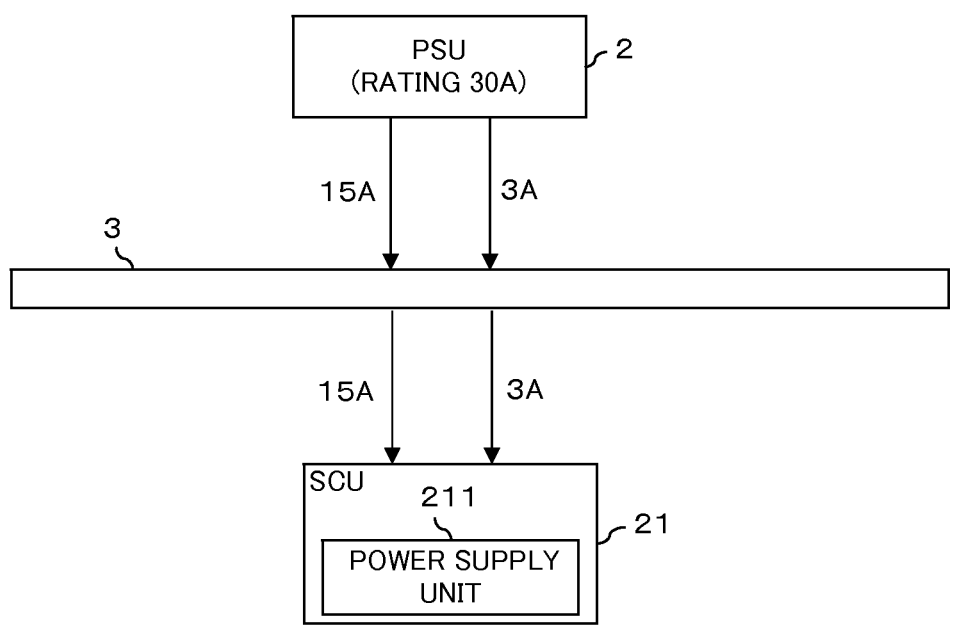
FIG. 2 is a schematic view depicting a charging path to an SCU as the example of the embodiment.
Figure 3:
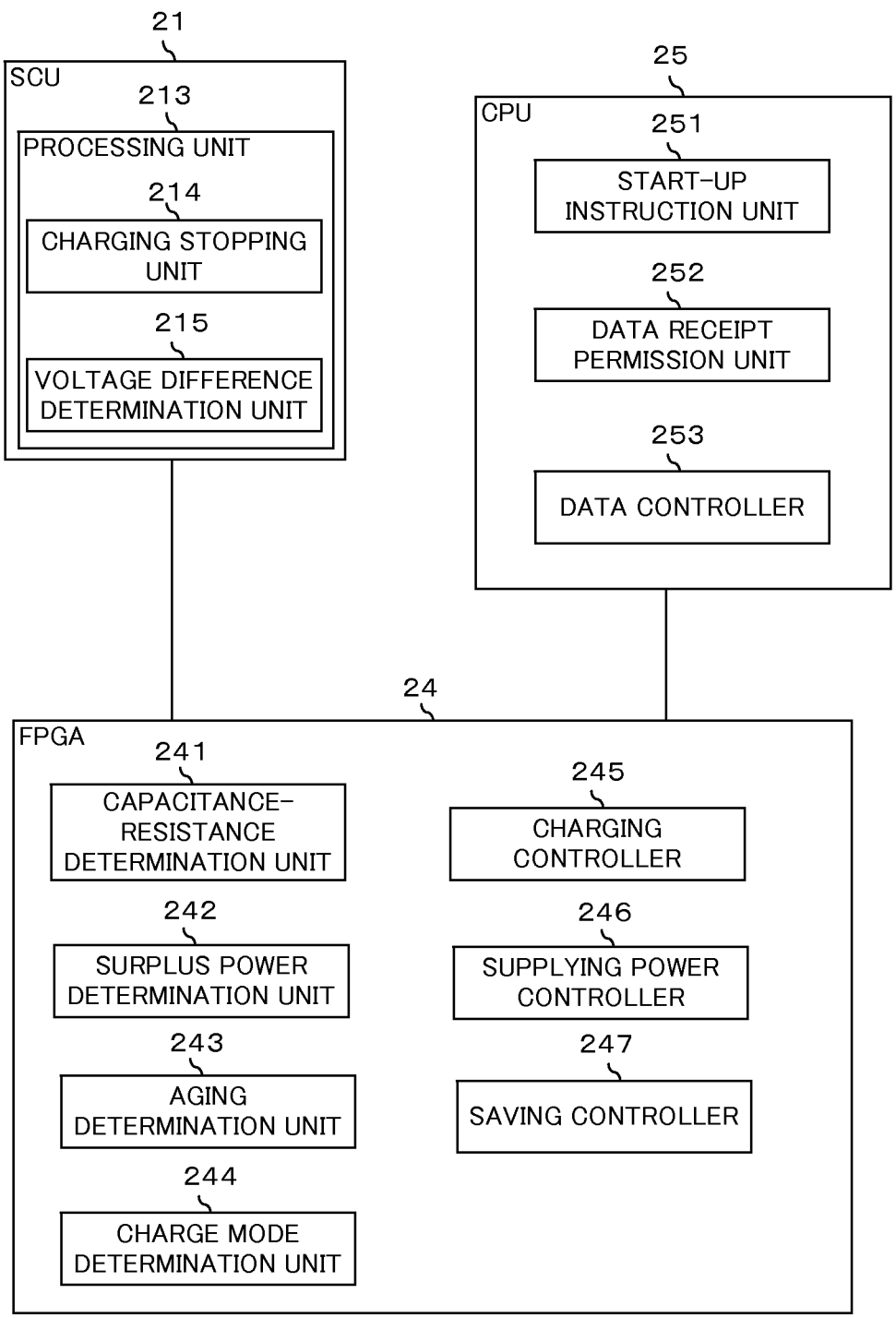
FIG. 3 is a schematic view depicting a functional configuration of a controller module as the example of the embodiment.

FIG. 1 is a view depicting a configuration of a storage apparatus as an example of an embodiment. FIG. 2 is a view schematically depicting a charging path of an SCU as the example of the embodiment. Further, FIG. 3 is a view schematically depicting a functional configuration of a controller module as the example of the embodiment.

As depicted in FIG. 1, the storage apparatus 1 as the example of the present embodiment includes controller modules 10-1 and 10-2, a PSU (Power Supply Unit) 20, a mid-plane 30 and an HDD (Hard Disk Drive) 40. The storage apparatus 1 is connected to a host 50 through a communication line such as a LAN (Local Area Network) or an FC (Fiber Channel). The controller modules 10-1 and 10-2, PSU 20 and HDD 40 are connected to each other through the mid-plane 30.

While, in the following description, as reference characters representing the controller modules, when it is necessary to specify one of the controller modules, reference characters 10-1 and 10-2 are used, when an arbitrary one of the controller modules is to specified, reference numeral 10 is used.

The PSU 20 converts AC (Alternating Current) power supplied from the outside of the storage apparatus 1 into DC (Direct Current) power and supplies the DC power to the controller modules 10 and the HDD 40 through the mid-plane 30.

The mid-plane 30 is a board for connecting, for example, the controller modules 10, PSU 20 and HDD 40 to each other and supplies power inputted from the PSU 20 to the controller modules 10.

The HDD 40 stores various kinds of data, for example, in response to a request from the host 50. In particular, the HDD 40 is an example of a storage unit for storing data.

The host 50 is a host apparatus for requesting writing and reading of data, for example, into and from the storage apparatus 1.

Each controller module 10 controls writing and reading of data into and from the HDD 40, for example, in response to a request from the host 50. In particular, the controller module 10 is an example of a controlling unit for carrying out data storage control for the storage unit.

The controller module 10 includes, for example, an SCU 21, an OR circuit 22 and a data processing unit 23.

The SCU 21 supplies power to the controller module 10, for example, upon power failure. In particular, for example, upon power failure, the SCU 21 supplies power to the components of the data processing unit 23 through the OR circuit 22. In other words, the SCU 21 is an example of a power supply unit for supplying power to the controlling unit when power supply from the outside to the storage apparatus stops.

More particularly, the SCU 21 includes, for example, a power supply unit 211, a nonvolatile memory 212 and a processing unit 213.

For example, if charging to the power supply unit 211 is carried out in a first mode or a second mode hereinafter described, then the SCU 21 supplies power to the mid-plane 30 after saving of data from the cache memory 26 into the flash memory 28. In particular, the SCU 21 supplies power to the mid-plane 30 so that the power is supplied to the controller modules 10 connected to the mid-plane 30 through the mid-plane 30.

The power supply unit 211 is, for example, an electric double layer capacitor and supplies power to the controller module 10. Further, the power supply unit 211 is charged, for example, by current outputted from the PSU 20. For example, one of first current (for example, current of 15 A) and second current (for example, current of 3 A) that is lower than the first current is inputted from the PSU 20 to the SCU 21 (power supply unit 211) through the mid-plane 30 as illustrated in FIG. 2. However, if a charging controlling circuit 245 hereinafter described carries out change-over between current of the two current values described above using a switch or the like, then the power supply unit 211 is charged in accordance with one of the first current value and the second current value.

The nonvolatile memory 212 retains, for example, fabrication time information indicating time, at which the SCU 21 was fabricated and a capacitance value and a direct current resistance value, determined by an FPGA (Field Programmable Gate Array) 24 hereinafter described, of the electric double layer capacitor as the power supply unit 211. For example, the fabrication time information includes a fabrication date and time (for example, year, month, day, hour, minute and second) when the SCU 21 was fabricated. In particular, the nonvolatile memory 212 is an example of a retention unit that retains a capacitance and a resistance of the capacitor and fabrication date and time of the power supply unit.

The processing unit 213 is a processing apparatus for implementing various functions and functions as a charging stopping unit 214 and a voltage difference determination unit 215, for example, as depicted in FIG. 3.

The charging stopping unit 214 stops charging to the power supply unit 211, for example, after the power supply unit 211 is charged to a final voltage. For example, the charging stopping unit 214 disconnects the charging path to the power supply unit 211 to stop the charging.

The voltage difference determination unit 215 determines a voltage drop ($V_{dcr}$ in FIG. 4 hereinafter described) arising from the direct current resistance of the power supply unit 211 after charging stopping. In particular, the voltage difference determination unit 215 monitors, for example, the voltage of the power supply unit 211 before charging stopping and the voltage of the power supply unit 211 after the charging stopping to determine a voltage difference between the voltage of the power supply unit 211 before charging stopping and the voltage of the power supply unit 211 after the charging stopping.

The OR circuit 22 is, for example, a circuit that receives an output ($V_{bp}$ in FIG. 1) from the mid-plane 30 and another output ($V_{bat}$ in FIG. 1) from the SCU 21 inputted thereto and supplies a higher one of voltages of the outputs as a voltage $V_{in}$ to the data processing unit 23.

The data processing unit 23 controls, for example, writing and reading of data into and from the HDD 40. The data processing unit 23 includes, for example, an FPGA 24, a CPU (Central Processing Unit) 25, the cache memory 26, a real time clock 27 and the flash memory 28. The FPGA 24 is connected for communication to the SCU 21, CPU 25, real time clock 27 and flash memory 28, and the CPU 25 is connected for communication to the cache memory 26.

The cache memory 26 retains, for example, data to be stored into the HDD 40. In other words, the cache memory 26 is an example of a cache memory for retaining data to be stored into a storage unit.

The real time clock 27 is a circuit that generates and outputs information indicative of, for example, the present date and time and so forth. The information generated by the real time clock 27 includes, for example, the year, month, day, hour, minute and second at present.

The flash memory 28 is a nonvolatile memory to which, for example, data retained by the cache memory 26 is saved when power supply from the PSU 20 stops. In particular, the flash memory 28 is an example of a nonvolatile memory to which the data retained by the cache memory is saved upon power failure.

The FPGA 24 is a processing apparatus that implements various functions in response to a program. The FPGA 24 is connected to the SCU 21 by an I2C (Inter Integrated Circuit) or the like and can monitor a voltage in the inside of the SCU 21 or the like through the I2C.

For example, as depicted in FIG. 3, the FPGA 24 functions as a capacitance-resistance determination unit 241, a surplus power determination unit 242, an aging determination unit 243, a charge mode determination unit 244, a charging controlling unit 245, a supplying power controller 246 and a saving controlling unit 247.

The capacitance-resistance determination unit 241 determines the capacitance and the direct current resistance of the electric double layer capacitor which is the power supply unit 211. In other words, the capacitance-resistance determination unit 241 is an example of a determination unit that determines the capacitance and the resistance of the capacitor.

Figure 4:
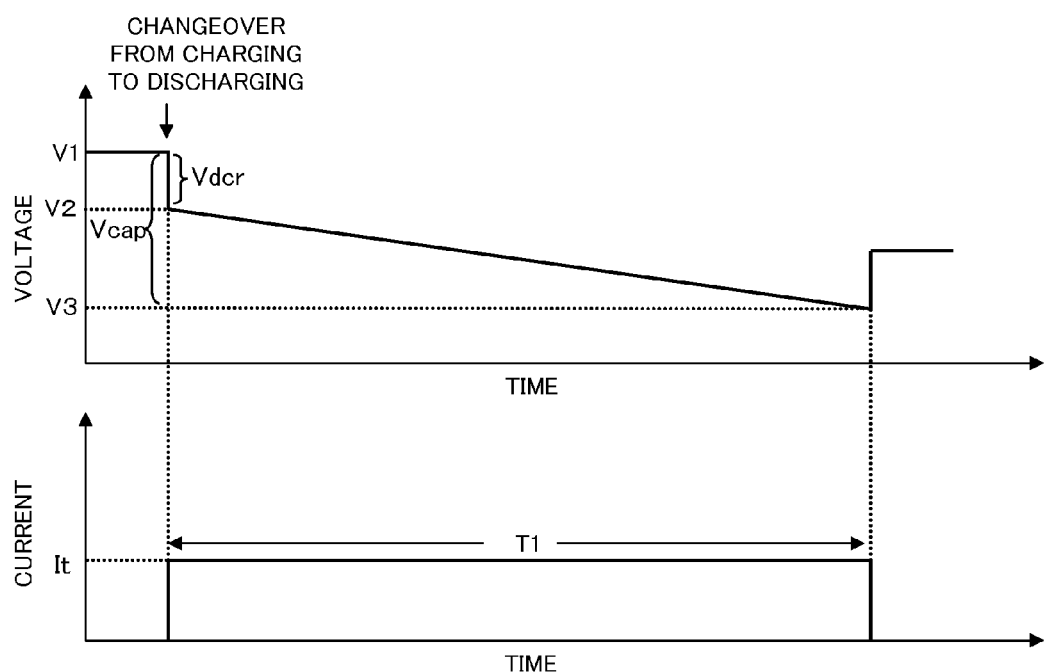
FIG. 4 is a schematic view illustrating a variation of a voltage and current upon test discharging as the example of the embodiment.

FIG. 4 is a view illustrating test discharging for determining the capacitance and the resistance of the power supply unit 211. As illustrated in FIG. 4, together with charging stopping by the charging stopping unit 214, the capacitance-resistance determination unit 241 starts discharging by constant current It to a diagnosis circuit not depicted included in the SCU 21. The capacitance-resistance determination unit 241 determines the direct current resistance of the power supply unit 211 based on the voltage difference $V_{dcr}$ (=V1−V2) determined by the voltage difference determination unit 215 and the constant current It. The capacitance-resistance determination unit 241 acquires a voltage (indicated by V3 in FIG. 4) of the power supply unit 211, for example, after a predetermined diagnosis time period T1 elapses, and stores the acquired voltage into an internal memory not depicted included in the FPGA 24. Then, the capacitance of the power supply unit 211 is determined based on a difference (indicated by $V_{cap}$ in FIG. 4) between a voltage V2 of the power supply unit 211 after charging stopping and a voltage V3 of the power supply unit 211 after the predetermined diagnosis time period T1 elapses and the constant current It.

It is to be noted that the capacitance-resistance determination unit 241 records the determined capacitance and the direct current resistance of the power supply unit 211 into the nonvolatile memory 212. Further, such a process as described above by the capacitance-resistance determination unit 241 is carried out at a predetermined timing after the storage apparatus 1 is started up, for example, after the voltage of the power supply unit 211 reaches the final voltage and the voltage difference $V_{dcr}$ is determined by the voltage difference determination unit 215.

The surplus power determination unit 242 determines a dischargeable time period, for example, based on the capacitance and direct current resistance values of the power supply unit 211 retained by the nonvolatile memory 212 and determines surplus power based on the determined dischargeable time period. The surplus power here represents the dischargeable time period, which exceeds a dischargeable time period of the SCU 21 when the product life cycle is exhausted, in a percentage with respect to the dischargeable time period of the SCU when the product life cycle is exhausted. In particular, the surplus power represents the difference between the dischargeable time period of the SCU 21 when the product life cycle is exhausted and the dischargeable time period of the SCU 21 determined based on the capacitance and direct current resistance values of the power supply unit 211 retained by the nonvolatile memory 212 in a percentage with respect to the dischargeable time period of the SCU 21 when the product life cycle is exhausted.

Figure 5:
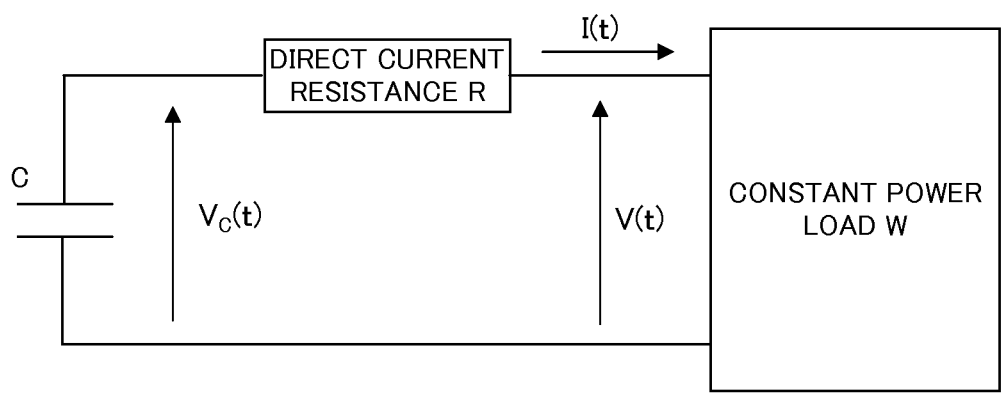
FIG. 5 is a schematic view depicting a circuit for determining a dischargeable time period as the example of the embodiment.

The surplus power determination unit 242 determines, for example, a dischargeable time period where a connection load to the power supply unit 211, which is an electric double layer capacitor, is a constant power load. FIG. 5 is a view equivalently depicting the data processing unit 23 and the power supply unit 211. In FIG. 5, a constant power load W is a power load to the data processing unit 23 and a direct current resistance R and a capacitance C represent the direct current resistance and the capacitance of the power supply unit 211, respectively. It is assumed here that a voltage $V_C(0)$ applied to the capacitance C upon starting of discharging is $V_C(0)=V_S$ and a voltage V(T) applied to the capacitance C and the direct current resistance R at discharging ending time T is $V(T)=V_E$. The discharge ending time T here represents a time period in which the voltage supplied from the SCU 21 drops to such a level that it cannot be converted any more into a suitable voltage to be supplied to the components of the data processing unit 23 by a DC/DC converter not shown provided between the SCU 21 and the data processing unit 23.

The voltage V(0) applied to the capacitance C and the direct current resistance R upon starting of discharging is represented, for example, by the following expression (1):

[Expression 1]

$$\frac{V(0)\left(V_S + \sqrt{V_S^2 - 4RW}\right)}{2} \quad (1)$$

The surplus power determination unit 242 substitutes the voltage V(0) determined in accordance with the expression (1) and the values of the capacitance and the resistance determined by the capacitance-resistance determination unit 241, for example, into the following expression (2) to determine the dischargeable time period T of the SCU 21. It is to be noted that W and $V_E$ are design values.

[Expression 2]

$$T = CR\left(\ln\frac{W}{V(0)} - \ln\frac{W}{V_E}\right) + \frac{CW}{2}\left(\frac{V(0)^2}{W^2} - \frac{V_R^2}{W^2}\right) \quad (2)$$

The surplus power determination unit 242 calculates surplus power based on a ratio between a dischargeable time period $T_{min}$ of the SCU 21 when the product life cycle is exhausted after several years (for example, five years) elapse from fabrication of the SCU 21 and the dischargeable time period T determined by the expression (2). Here, the dischargeable time period $T_{min}$ of the SCU 21 after several years (for example, five years) elapse from fabrication of the SCU 21 is determined in accordance with the expressions (1) and (2) assuming that the capacitance of the power supply unit 211 exhibits a value of 70% in comparison with that upon fabrication and the direct current resistance of the power supply unit 211 exhibits a value of 130% in comparison with that upon fabrication. For example, if the dischargeable time period $T_{min}$ of the SCU 21 after several years (for example, five years) elapse from fabrication of the SCU 21 is 30 seconds and the dischargeable time period T determined based on the expression (2) is 60 seconds, then the surplus power is 100%. Further, for example, if the SCU 21 (power supply unit 211) is charged to a target voltage (first target voltage) in each mode hereinafter described above, then since the dischargeable time period of the SCU 21 is equal to or substantially equal to the dischargeable time period of the SCU 21 when the product life cycle is exhausted, the surplus power is 0%. In other words, the surplus power determination unit 242 is an example of a surplus power determination unit that determines surplus power by which power supplied from a power supply unit and required for saving of data into a nonvolatile memory is exceeded. It is to be noted that the power required for saving of data into the nonvolatile memory is determined in advance at a design stage, for example, based on the configuration of the controller module 10 such as a capacitance of the nonvolatile memory. Further, the power required for saving of data into the nonvolatile memory can be calculated based on the capacitance and the direct current resistance of the power supply unit 211 when the product life cycle is exhausted or the like.

The aging determination unit 243 determines, for example, elapsed time after fabrication of the SCU 21. In particular, the aging determination unit 243 determines elapsed time after fabrication of the SCU 21 based on a difference between the information indicating the present date and time or the like obtained from the real time clock 27 and information upon fabrication of the SCU 21 retained by the nonvolatile memory 212.

The charge mode determination unit 244 determines a charge mode of the power supply unit 211, for example, based on the surplus power determined by the surplus power determination unit 242 and the elapsed time after fabrication of the SCU 21 determined by the aging determination unit 243. More particularly, the charge mode determination unit 244 determines a charge mode, for example, in accordance with conditions depicted in FIG. 6. For example, if the elapsed time after fabrication is equal to or shorter than 60 months and the surplus power is equal to or higher than 30%, then the charge mode determination unit 244 determines the charge mode to a first mode (Very Fast). If the elapsed time after fabrication is equal to or shorter than the product life (for example, 60 months) and the surplus power is equal to or higher than 20% but is lower than 30%, then the charge mode determination unit 244 determines the charge mode to a second mode (Fast). If the elapsed time after fabrication is longer than 60 months and the surplus power is equal to or higher than 10% and besides the elapsed time after fabrication is equal to or shorter than 60 months and the surplus power is lower than 20%, then the charge mode is determined to a third mode (Normal). If the elapsed time after fabrication is longer than 60 months and the surplus power is lower than 10%, then the charge mode determination unit 244 determines the charge mode to a fourth mode (Slow). It is to be noted that the values used for conditions for determining a charge mode are not limited to such values as 60 months described above, but various values can be used.

Here, the charge modes are described with reference to FIG. 7.

First, in the first mode, for example, charging to the power supply unit 211 is carried out by current of the first current value (for example, 15 A) until the charged voltage reaches a target voltage $V_{vf}$ in the first mode and, if the charged voltage reaches the target voltage $V_{vf}$, then charging to the power supply unit 211 is carried out by current of the second current value (for example, current of 3 A) until the charged amount reaches a final voltage $V_{fin}$. In the second mode, for example, charging to the power supply unit 211 is carried out by the first current value (for example, current of 15 A) until the charged voltage reaches a target voltage $V_f$ in the second mode and, if the charged voltage reaches the target voltage, then charging to the power supply unit 211 is carried out by current of the second current value (for example, current of 3 A) until the charged voltage reaches the final voltage $V_{fin}$. In the third mode, for example, charging to the power supply unit 211 is carried out by current of the first current value (for example, current of 15 A) until the charged voltage reaches a target voltage $V_n$ in the third mode and, if the charged amount reaches the target voltage $V_n$, then charging to the power supply unit 211 is carried out by current of the second current value (for example, current of 3 A) until the charged voltage reaches the final voltage $V_{fin}$. In the fourth mode, for example, charging to the power supply unit 211 is carried out by current of the first current value (for example, 15 A) until the charged voltage reaches a target voltage $V_S$ in the fourth mode and, if the charged voltage reaches the target voltage $V_S$, then charging to the power supply unit 211 is carried out by current of the second current value (for example, current of 3 A) until the charged voltage reaches the final voltage $V_{fin}$. In particular, the target voltage in each of the modes is an example of a first target voltage to be targeted when the charging process is carried out for the power supply unit. Meanwhile, the final voltage $V_{fin}$ is an example of a second target voltage.

It is to be noted that the target voltages have a relationship of $V_{vf} < V_f < V$, $< V_S < V_{fin}$. Further, the target voltages in the charge modes here are voltages with which the power supply unit 211 can supply power required for saving data from the cache memory 26 into the flash memory 28.

The charging controlling unit 245 controls charging to the power supply unit 211, for example, in response to the charge mode determined by the charge mode determination unit 244. In particular, for example, the charging controlling unit 245 carries out charging to the power supply unit 211 using current of 15 A until the charged voltage reaches the target voltage in accordance with the charge mode determined by the charge mode determination unit 244. Further, where the charged voltage exceeds the target voltage, the charging controlling unit 245 carries out charging to the power supply unit 211 using current of 3 A until the charged voltage reaches the final voltage. In other words, the charging controlling unit 245 carries out changeover control from charging with 15 A to charging with 3 A. In other words, the charging controlling unit 245 is an example of a charging processing unit that carries out the charging process to the power supply unit 211 in accordance with a first current value until the voltage charged to the power supply unit 211 reaches the first target voltage, and carries out the charging process to the power supply unit 211 in accordance with a second current value lower than the first current value until the voltage charged to the power supply unit 211 reaches the second target voltage that is higher than the first target voltage from the first target voltage.

The changeover from the charging with 15 A to the charging with 3 A is implemented, for example, by the charging controlling unit 245 selectively changing over the current of 15 A and the current of 3 A inputted to the SCU 21 by a switch or the like.

The supplying power controller 246 controls, for example, power to be supplied from the SCU 21. In particular, if saving of data from the cache memory 26 to the flash memory 28 is completed, then the supplying power controller 246 stops the power supply to the OR circuit 22 and starts power supply (voltage $V_{sub}$ in FIG. 1) to the mid-plane 30. The voltage $V_{sub}$ outputted from the controller modules 10-1 and 10-2 is applied as a voltage $V_{bp}$ to the data processing unit 23 through the mid-plane 30. Here, the supplying power controller 246 stops the power supplying to the CPU 25, real time clock 27 and flash memory 28. On the other hand, the supplying power controller 246 continues the power supplying to the cache memory 26 through the mid-plane 30 to carry out backup. In particular, the voltage $V_{sub}$ is applied as the voltage $V_{bp}$ to the cache memory 26 through the mid-plane 30.

The saving controlling unit 247 carries out saving of data from the cache memory 26 to the flash memory 28. It is to be noted that, for example, the saving controlling unit 247 is implemented by a DMA (Direct Memory Access) circuit included in the FPGA 24.

The CPU 25 is a processing apparatus that executes various application programs stored, for example, in a storage unit not shown to carry out various arithmetic operations and controls to implement various functions. For example, the CPU 25 carries out writing and reading of data into and from the HDD 40.

For example, the CPU 25 functions as a start-up instruction unit 251, a data receipt permission unit 252 and a data controller 253 as illustrated in FIG. 3 by executing an application program.

If the power supply unit 211 is charged to the target voltage, then the start-up instruction unit 251 causes the HDD 40 to carry out spin-up. In other words, the start-up instruction unit 251 is an example of a start-up processing unit that carries out, when the power supply unit 211 is charged to the first target voltage, a start-up process for the storage unit.

For example, when the spin-up of the HDD 40 is completed, the data receipt permission unit 252 issues a notification that data receipt is permitted to the host 50. In other words, the data receipt permission unit 252 is an example of a data receipt permission unit that permits, when the storage unit is started up, data receipt from a host apparatus connected to the storage apparatus.

The data controller 253 carries out, for example, data control of writing and reading of data into and from the HDD 40. More particularly, if the power supplying from the PSU 20 is re-started after power failure, then after saving of data into the flash memory 28 by the saving controlling unit 247 or during backup into the cache memory 26 by the supplying power controller 246, the data controller 253 carries out data control using the data retained by the cache memory 26.

Further, when the power supplying from the PSU 20 is re-started after the power failure and after ending of the power supplying to the cache memory 26, the data control is carried out using the data retained by the nonvolatile memory 28.

Figure 8:
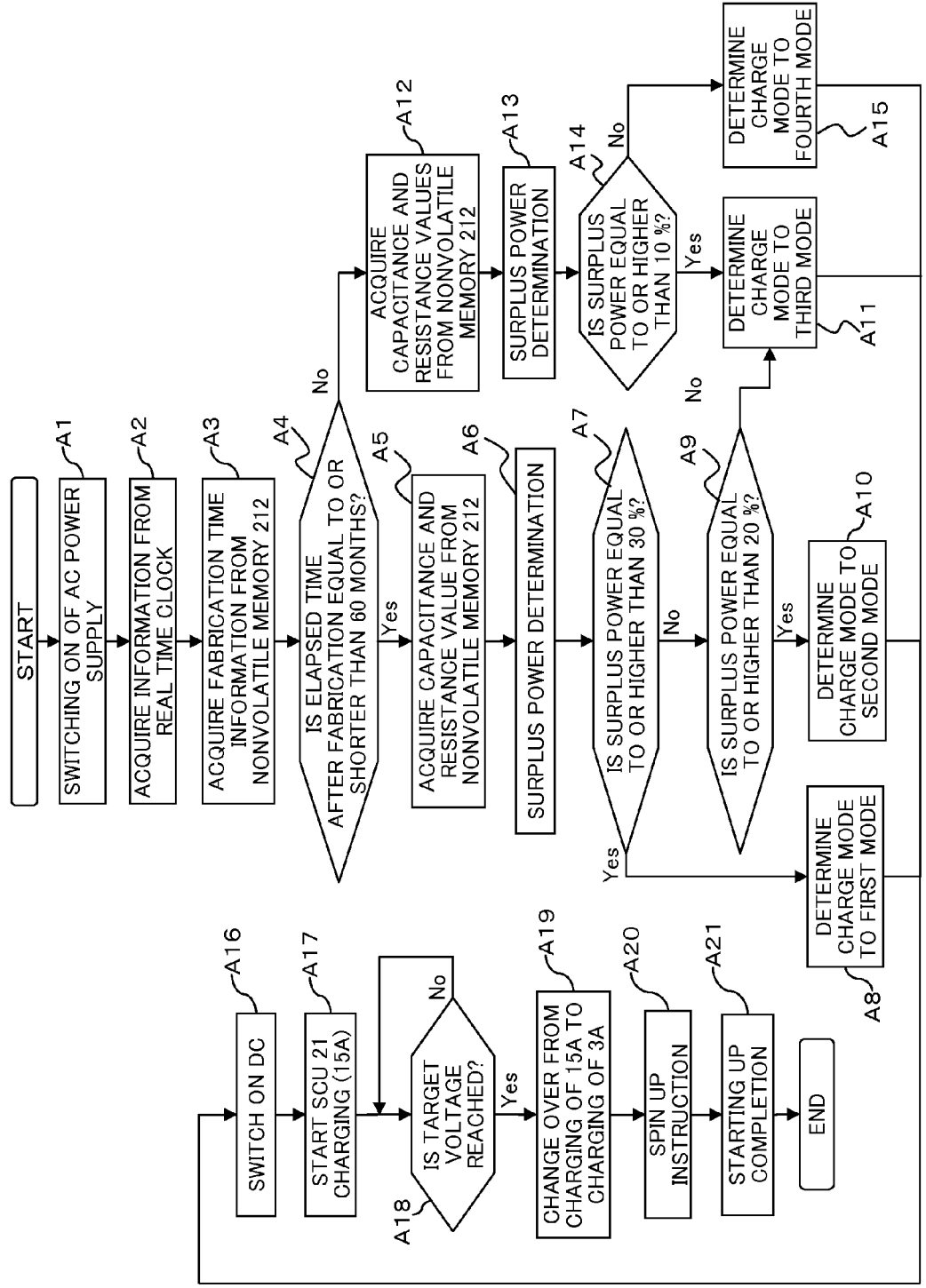
FIG. 8 is a flow chart illustrating operation of the storage apparatus as the example of the embodiment.

Operation of the storage apparatus 1 as the example of the embodiment configured in such a manner as described above is described with reference to a flow chart (steps A1 to A21) depicted in FIG. 8.

First, if AC power supply is turned on (step A1), then the aging determination unit 243 acquires information indicating the present date and time or the like from the real time clock 27 (step A2) and acquires information at the time of fabrication of the SCU 21 retained by the nonvolatile memory 212 (step A3). Then, the aging determination unit 243 determines elapsed time after fabrication of the SCU 21 based on the information acquired at steps A2 and A3.

Then, the charge mode determination unit 244 decides whether or not the elapsed time after fabrication is equal to or shorter than, for example, 60 months (step A4). If the elapsed time after fabrication is equal to or shorter than 60 months (refer to the Yes route at step A4), then the surplus power determination unit 242 acquires capacitance and resistance values from the nonvolatile memory 212 (step A5) and determines surplus power, for example, using the expressions (1) and (2) given hereinabove (step A6).

After the surplus power is determined, the charge mode determination unit 244 decides whether or not the determined surplus power is equal to or higher than 30% (step A7). If the surplus power is equal to or higher than 30% (refer to the Yes route at step A7), then the charge mode determination unit 244 determines the charge mode to the first mode (step A8). On the other hand, if the surplus power is lower than 30% (refer to the No route at step A7), then the charge mode determination unit 244 subsequently decides whether or not the surplus power is equal to or higher than 20% (step A9). If the surplus power is equal to or higher than 20% (refer to the Yes route at step A9), then the charge mode determination unit 244 determines the charge mode to the second mode (step A10). On the other hand, if the surplus power is lower than 20% (refer to the No route at step A9), then the charge mode determination unit 244 determines the charge mode to the third mode (step A11).

It is to be noted that, if the elapsed time after fabrication is equal to or longer than 60 months (refer to the No route at step A4), then the surplus power determination unit 242 acquires the capacitance and resistance values from the nonvolatile memory 212 (step A12) and determines surplus power, for example, using the expressions (1) and (2) given above (step A13) similarly as at steps A5 and A6, respectively. Then, the charge mode determination unit 244 decides whether or not the determined surplus power is equal to or higher than 10% (step A14). If the surplus power is equal to or higher than 10% (refer to the Yes route at step A14), then the charge mode determination unit 244 determines the charge mode to the third mode (step A11). On the other hand, if the surplus power is lower than 10% (refer to No route at step A14), then the charge mode determination unit 244 determines the charge mode to the fourth mode (step A15).

If DC power supply is turned on in the state in which the charge mode is determined (step A16), then the charging controlling unit 245 carries out charging to the power supply unit 211 using the current of 15 A supplied from the PSU 20 (step A17). The charging controlling unit 245 decides whether or not the power supply unit 211 is charged to the target voltage corresponding to the charge mode determined by the charge mode determination unit 244 (step A18). If the power supply unit 211 is not charged to the target voltage (refer to the No route at step A18), then the process at step A18 is repetitively carried out. On the other hand, if the power supply unit 211 is charged to the target voltage (refer to the Yes route at step A18), then the charging controlling unit 245 carries out charging to the power supply unit 211 using the current of 3 A supplied from the PSU 20. In other words, the charging controlling unit 245 carries out changeover from the charging with 15 A to charging with 3 A (step A19). The start-up instruction unit 251 issues an instruction for causing the HDD 40 to carry out spin up together with the changeover by the charging controlling unit 245 from charging with 15 A to charging with 3 A to cause the HDD 40 to carry out spin up (step A20). Then, if the spin up is completed, then the start-up of the storage apparatus 1 is completed (step A21).

Now, start-up time of the storage apparatus 1 in the example of the present embodiment is described below with reference to FIG. 7.

For example, a case is considered in which the rated current of the PSU 20 and current required for the spin up of one HDD 40 are 30 A and 3 A, respectively, and 15 seconds are required for completion of the spin up and the storage apparatus 1 includes 24 HDDs 40.

First, if the charge mode is the first mode, then the power supply unit 211 that is an electric double layer capacitor and is included in each of the controller modules 10-1 and 10-2 is charged up to the target voltage $V_{vf}$ by current of 15 A. In particular, the current of totaling 30 A is used for the charging to the two power supply units 211. Then, if the power supply units 211 are charged up to the target voltage $V_{vf}$, then the power supply unit 211 that is an electric double layer capacitor and is included in each of the controller modules 10-1 and 10-2 is charged by current of 3 A. Further, the spin up of every eight HDDs 40 is carried out separately by three times. In particular, the current of totaling 6 A is used for the charging of the two power supply units 211, and remaining 24 A is used for the spin up of eight HDDs 40.

Figure 7:
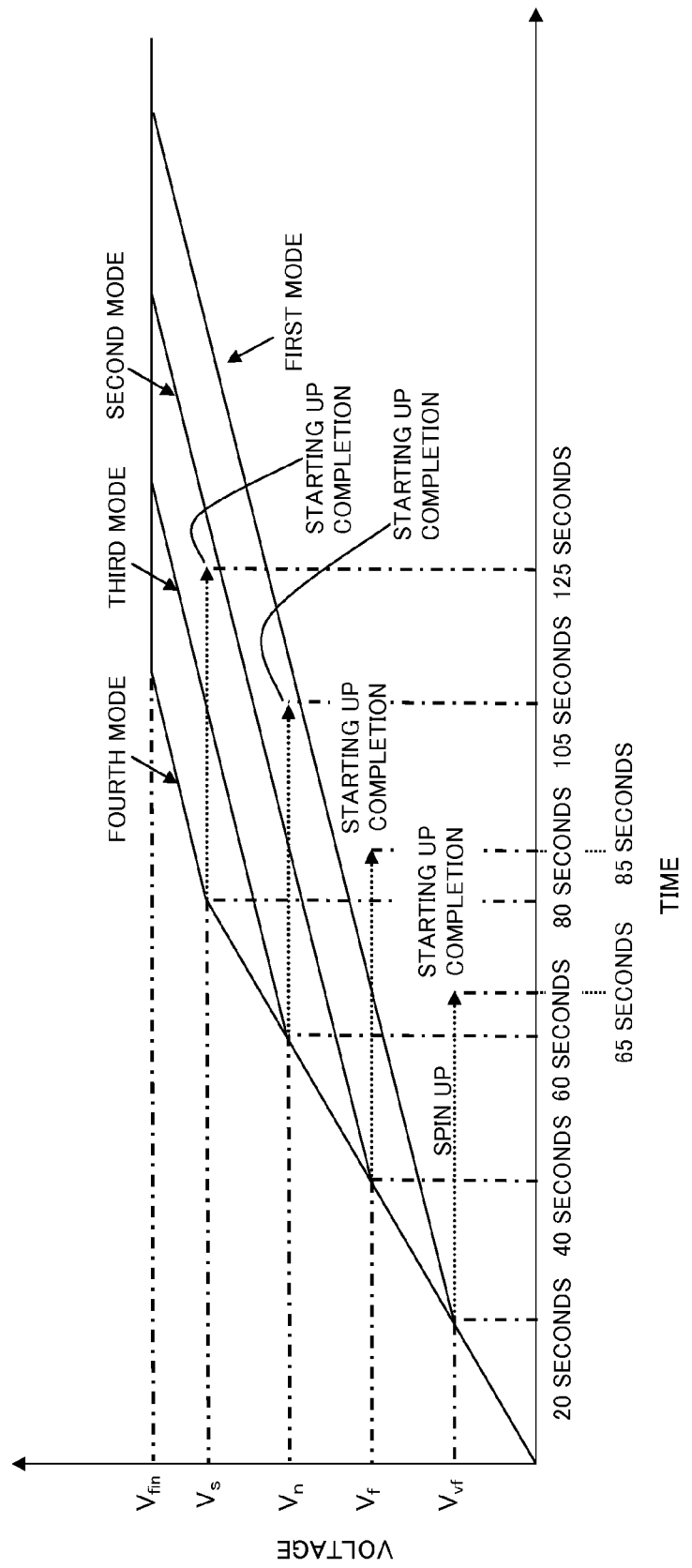
FIG. 7 is a view illustrating a variation of a voltage in charge modes as the example of the embodiment.

Accordingly, in the first mode, 65 seconds are required as depicted in FIG. 7 after starting (DC on) of the charging to the power supply unit 211 till completion of the spin up of the 24 HDDs 40 after reaching to the target voltage $V_{vf}$, namely, till start-up of the storage apparatus 1.

Where the charge mode is the second mode, the power supply unit 211 that is an electric double layer capacitor and is included in each of the controller modules 10-1 and 10-2 is charged up to the target voltage $V_f$ by current of 15 A. In particular, the current of totaling 30 A is used for the charging of the two power supply units 211. Then, if the power supply units 211 are charged up to the target voltage $V_f$, then the power supply unit 211 that is an electric double layer capacitor and is included in each of the controller modules 10-1 and 10-2 is charged by current of 3 A. Further, the spin up of every eight HDDs 40 is carried out separately by three times. In particular, the current of totaling 6 A is used for the charging of the two power supply units 211, and the remaining 24 A is used for the spin up of eight HDDs 40.

Accordingly, in the second mode, 85 seconds are required as depicted in FIG. 7 after starting (DC on) of the charging to the power supply unit 211 till completion of the spin up of the 24 HDDs 40 after reaching to the target voltage $V_f$, namely, till start-up of the storage apparatus 1.

Where the charge mode is the third mode, the power supply unit 211 that is an electric double layer capacitor and is included in each of the controller modules 10-1 and 10-2 is charged up to the target voltage $V_n$ by current of 15 A. In particular, the current of totaling 30 A is used for the charging of the two power supply units 211. Then, if the power supply units 211 are charged up to the target voltage $V_n$, then the power supply unit 211 that is an electric double layer capacitor and is included in each of the controller modules 10-1 and 10-2 is charged by current of 3 A. Further, the spin up of every eight HDDs 40 is carried out separately by three times. In particular, the current of totaling 6 A is used for the charging of the two power supply units 211, and the remaining 24 A is used for the spin up of eight HDDs 40.

Accordingly, in the third mode, 105 seconds are required as depicted in FIG. 7 after starting (DC on) of the charging to the power supply unit 211 till completion of the spin up of the 24 HDDs 40 after reaching to the target voltage $V_n$, namely, till start-up of the storage apparatus 1.

Where the charge mode is the fourth mode, the power supply unit 211 that is an electric double layer capacitor and is included in each of the controller modules 10-1 and 10-2 is charged up to the target voltage $V_s$ by current of 15 A. In particular, the current of totaling 30 A is used for the charging of the two power supply units 211. Then, if the power supply units 211 are charged up to the target voltage $V_s$, then the power supply unit 211 that is an electric double layer capacitor and is included in each of the controller modules 10-1 and 10-2 is charged by current of 3 A. Further, the spin up of every eight HDDs 40 is carried out separately by three times. In particular, the current of totaling 6 A is used for the charging of the two power supply units 211, and the remaining 24 A is used for the spin up of eight HDDs 40.

Accordingly, in the fourth mode, 125 seconds are required as depicted in FIG. 7 after starting (DC on) of the charging to the power supply unit 211 till completion of the spin up of the 24 HDDs 40 after reaching to the target voltage $V_s$, namely, till start-up of the storage apparatus 1.

Figure 9:
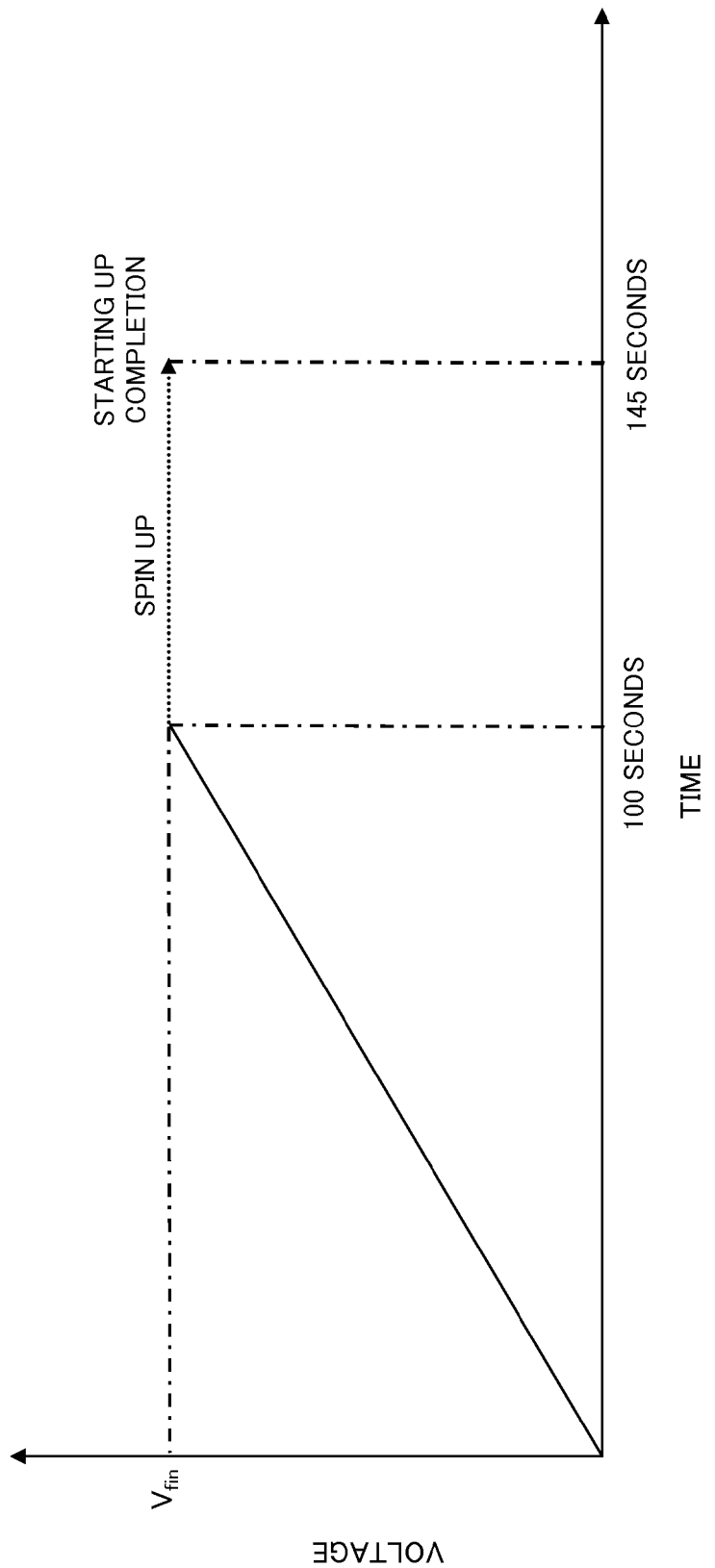
FIG. 9 is a view illustrating the example where charging is carried out without varying current.

Here, in order to compare with start-up time of the storage apparatus 1 in the example of the present embodiment, it is assumed that charging to the power supply unit 211 is carried out up to the final voltage using 15 A as it is without varying the current value similarly as in the example of the present embodiment and then the spin up of the HDD 40 is carried out. In this instance, since the power supply unit 211 that is an electric double layer capacitor and is included in each of the controller modules 10-1 and 10-2 is charged up to the final voltage using current of 15 A as depicted in FIG. 9, the spin up of the HDD 40 cannot be carried out. Accordingly, the spin up of the HDD 40 is carried out divisionally by three times after the power supply unit 211 is charged to the final voltage.

Accordingly, in this instance, 145 seconds are required as depicted in FIG. 9 until the spin up of the 24 HDDs 40 is completed and the storage apparatus 1 is started up.

In particular, with the example of the present embodiment, also in the case in which the charge mode is the fourth mode, the storage apparatus 1 can be started up earlier by 20 seconds in comparison with an alternative case in which the charging is carried out without varying the current value as in the example of the present embodiment. Further, where the charge mode is the first mode, the storage apparatus 1 can be started up earlier by 80 seconds in comparison with an alternative case in which the charging is carried out without varying the current value as in the example of the present embodiment.

Figure 10:
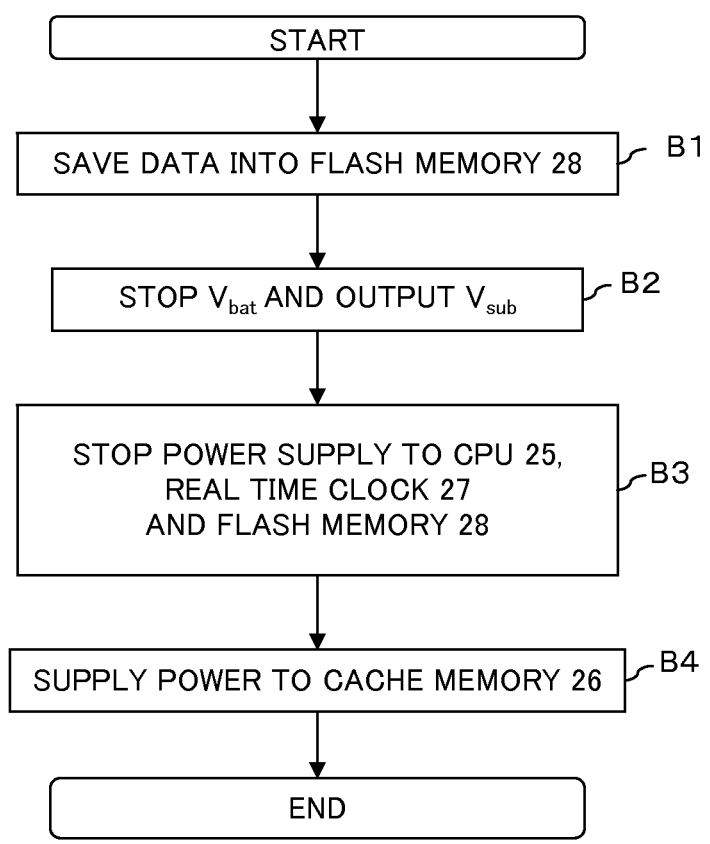
FIG. 10 is a flow chart illustrating operation of the storage apparatus upon power failure as the example of the embodiment.

Now, a process of the storage apparatus 1, for example, when power failure occurs after the storage apparatus 1 is started up in the first mode or the second mode is described with reference to FIG. 10. FIG. 10 is a flow chart illustrating operation of the storage apparatus upon power failure as the example of the embodiment.

First, if power failure occurs, then the saving controlling unit 247 carries out saving of data from the cache memory 26 into the flash memory 28 (step B1). After the saving of the data from the cache memory 26 to the flash memory 28 is completed, the supplying power controller 246 stops power supply (in FIG. 1, the voltage $V_{bat}$) to the OR circuit 22 by the SCU 21 and starts power supply (voltage $V_{sub}$ in FIG. 1) to the mid-plane 30 (step B2). Further, the supplying power controller 246 stops the power supply to the CPU 25, real time clock 27 and flash memory 28 by the SCU 21 (step B3). On the other hand, the voltage $V_{sub}$ outputted from the PSU 20 is supplied as the voltage $V_{bp}$ to the cache memory 26 through the mid-plane 30. In other words, the power supplying is continued for the cache memory 26 (step B4).

In this manner, with the example of the present embodiment, time required for starting up of the storage apparatus can be reduced while required power upon power failure is secured.

Further, with the example of the present embodiment, time required for starting up of the storage apparatus can be reduced by selecting an optimum charging method taking degradation of the capacitance and the direct current resistance arising from time-dependent deterioration of the SCU 21 into consideration, namely, taking a use situation of the SCU 21 into consideration.

Further, with the example of the present embodiment, since not only saving of data from the cache memory 26 to the flash memory 28 but also backup of the cache memory 26 using surplus power of the SCU 21 are carried out upon power failure, the reliability of the storage apparatus 1 can be enhanced.

Further, with the example of the present embodiment, when the power failure is canceled during backup of the cache memory 26 using the surplus power of the SCU 21, rewriting from the flash memory 28 to the cache memory 26 is not required. Accordingly, with the example of the present embodiment, the storage apparatus can immediately recover a state before the power failure.

Further, in the example of the present embodiment, when it is determined that charging is to be carried out in the first mode or the second mode, namely, when the SCU 21 has surplus power, not only saving of data into the flash memory 28 but also backup of the cache memory 26 are carried out. Accordingly, with the example of the present embodiment, in comparison with an alternative case in which the power retained by the SCU 21 is used only for the saving of data into the flash memory 28, the consumption efficiency of the power retained by the SCU 21 can be enhanced.

Further, with the example of the present embodiment, since the control of the SCU 21 is carried out by the FPGA 24, the control of the SCU 21 can be carried out without waiting start-up of firmware in comparison with an alternative case in which the control of the SCU 21 is carried out using the CPU 25.

Further, with the example of the present embodiment, since monitoring of the real time clock 27 is carried out by the FPGA 24, monitoring of the real time clock 27 can be carried out without waiting start-up of firmware in comparison with an alternative case in which monitoring of the real time clock 27 is carried out using the CPU 25. It is to be noted that the technology disclosed herein is not limited to the embodiment described above and variations and modifications can be made without departing from the scope of the present embodiment.

For example, in the example of the present embodiment, charging is carried out by current of 15 A and 3 A for the SCU 21. However, the present embodiment is not limited to this and the charging may be carried out using different current values.

Further, in the example of the present embodiment, the SCU 21 includes the charging stopping unit 214 and the voltage difference determination unit 215. However, the present embodiment is not limited to this. For example, the FPGA 24 may include the functions of the charging stopping unit 214 and the voltage difference determination unit 215.

Further, in the example of the present embodiment, the dischargeable time $T_{min}$ of the SCU 21 when the product life cycle is exhausted is determined assuming that the capacitance of the power supply unit 211 has a value of 70% in comparison with that upon fabrication and the direct current resistance has a value of 130% in comparison with that upon fabrication. However, the present embodiment is not limited to this. For example, the dischargeable time $T_{min}$ of the SCU 21 when the product life cycle is exhausted may be determined assuming that the capacitance of the power supply unit 211 has a value different from 70% in comparison with that upon fabrication and the direct current resistance has a value different from 130% in comparison with that upon fabrication.

Further, while, in the example of the present embodiment, the four modes are provided as the charge mode, the present embodiment is not limited to this. For example, more detailed conditions may be set so that five or more modes are provided as the charge mode or more rough conditions may be set so that three or less modes are provided as the charge mode.

Further, while, in the example of the present embodiment, the charge mode is determined based on the elapsed time after fabrication and the surplus power, the present embodiment is not limited to this. For example, the charge mode may be determined based only on the surplus power or the surplus power may be determined based only on the elapsed time after fabrication.

Figure 11:
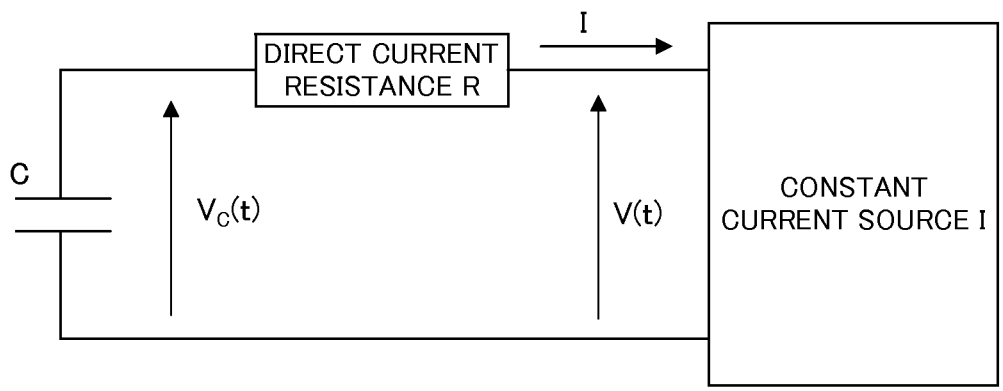
FIG. 11 is a schematic view depicting a circuit for determining a dischargeable time period as the example of the embodiment.

Further, in the example of the present embodiment, the dischargeable time is determined based on the expressions (1) and (2) assuming that the surplus power determination unit 242 determines the dischargeable time, for example, in the case in which the connection load to the power supplying unit 211 is the constant power load, the present embodiment is not limited to this. For example, the surplus power determination unit 242 may determine a dischargeable time period in the case in which the connected load to the power supplying unit 211 is a constant current load. FIG. 11 is a view equivalently depicting the data processing unit 23 and the power supplying unit 211. In FIG. 11, a constant current source I indicates current consumed by the data processing unit 23 and a direct current resistance R and a capacitance C represent the direct current resistance and the capacitance of the power supply unit 211, respectively. It is assumed here that a voltage $V_C(0)$ applied to the capacitance C upon starting of discharging is $V_C(0)=V_S$ and a voltage $V(T)$ applied to the capacitance C and the direct current resistance R at discharging end time T is $V(T)=V_E$. The dischargeable time period T is represented by the following expression (3):

[Expression 3]

$$T = \frac{C}{I(V_S - V_E - RI)} \quad (3)$$

The surplus power determination unit 242 may determine the dischargeable time period T using the expression (3).

Further, the present embodiment can be carried out and fabricated by a person skilled in the art based on the disclosure described above.

With the storage apparatus, control apparatus and control method of the disclosure, the start-up time period of the storage apparatus can be reduced while required power upon service interruption is secured.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage apparatus that includes a storage unit that stores data and a controller that carries out data storage control for the storage unit, comprising:
    a power supply unit, including a capacitor that supplies power decreasing by time-dependent deterioration, that supplies power to the controller upon power failure, when power supply from outside of the storage apparatus stops;
    a cache memory that retains data to be stored into the storage unit;
    a nonvolatile memory into which the data retained in the cache memory is saved upon power failure;
    a surplus power determination unit that determines surplus power, based on capacitance of the capacitor, to be supplied by the power supply unit for saving of data into the nonvolatile memory is exceeded;
    a target voltage determination unit that determines a first target voltage, based on elapsed time after fabrication of the power supply unit, that is a target in a charging process to the power supply unit based on the surplus power determined by the surplus power determination unit, and at which the power supply unit is capable of supplying power to the controller to save the data into the nonvolatile memory; and
    a charging processing unit that carries out a charging process for the power supply unit with a first current value until the voltage charged in the power supply unit reaches the first target voltage and that carries out a charging process for the power supply unit with a second current value lower than the first current value until the voltage charged in the power supply unit reaches a second target voltage higher than the first target voltage from the first target voltage.

2. The storage apparatus according to claim 1, further comprising a start-up processing unit that carries out a start-up process for the storage unit when the power supply unit is charged to the first target voltage.

3. The storage apparatus according to claim 2, further comprising a data reception permission unit that permits data reception from a host apparatus connected to the storage apparatus when the storage unit is started up.

4. The storage apparatus according to claim 1,
    wherein the capacitor included in the power supply unit is charged by the charging processing unit; and
    wherein the storage apparatus further comprises:
        a determination unit that determines the capacitance and a resistance of the capacitor; and
        a retention unit that retains the capacitance and the resistance of the capacitor determined by the determination unit and fabrication date and time of the power supply unit;
    wherein the surplus power determination unit determines the surplus power based on the capacitance and the resistance of the capacitor retained by the retention unit; and
    wherein the target voltage determination unit determines the elapsed time after fabrication of the power supply unit based on the fabrication date and time retained by the retention unit.

5. The storage apparatus according to claim 1,
    further comprising a saving controller that saves, upon power failure, the data retained in the cache memory into the nonvolatile memory;
    wherein the power supply unit supplies the power to the cache memory also after the saving by the saving controller is completed.

6. A control apparatus that carries out data storage control for a storage unit that stores data, comprising:
    a power supply unit, including a capacitor that supplies power decreasing by time-dependent deterioration, that supplies power to the control apparatus upon power failure, when power supply from outside of the storage unit stops;
    a cache memory that retains data to be stored into the storage unit;
    a nonvolatile memory into which the data retained in the cache memory is saved upon power failure;
    a surplus power determination unit that determines surplus power, based on capacitance of the capacitor, to be supplied by the power supply unit for saving of data into the nonvolatile memory is exceeded;
    a target voltage determination unit that determines a first target voltage, based on elapsed time after fabrication of the power supply unit, that is a target in a charging process to the power supply unit based on the surplus power determined by the surplus power determination unit, and at which the power supply unit is capable of supplying power to the controller to save the data into the nonvolatile memory; and
    a charging processing unit that carries out a charging process for the power supply unit with a first current value until the voltage charged in the power supply unit reaches the first target voltage and that carries out a charging process for the power supply unit with a second current value lower than the first current value until the voltage charged in the power supply unit reaches a second target voltage higher than the first target voltage from the first target voltage.

7. The control apparatus according to claim 6, further comprising a start-up processing unit that carries out a start-up process for the storage unit when the power supply unit is charged to the first target voltage.

8. The control apparatus according to claim 7, further comprising a data reception permission unit that permits data reception from a host apparatus connected to the storage apparatus when the storage unit is started up.

9. The control apparatus according to claim 6,
    wherein the capacitor included in the power supply unit that is charged by the charging processing unit; and
    wherein the control apparatus further comprises:
        a determination unit that determines a capacitance and a resistance of the capacitor; and a retention unit that retains the capacitance and the resistance of the capacitor determined by the determination unit and fabrication date and time of the power supply unit;

wherein the surplus power determination unit determines the surplus power based on the capacitance and the resistance of the capacitor retained by the retention unit; and wherein the target voltage determination unit determines the elapsed time after fabrication of the power supply unit based on the fabrication date and time retained by the retention unit.

10. The control apparatus according to claim 6, further comprising a saving controller that saves, upon power failure, the data retained in the cache memory into the nonvolatile memory;

wherein the power supply unit supplies the power to the cache memory also after the saving by the saving controller is completed.

11. A control method for a storage apparatus that includes: a storage unit that stores data; a controller that carries out data storage control for the storage unit; a power supply unit, including a capacitor that supplies power decreasing by time-dependent deterioration, that supplies power to the controller upon power failure, when power supply from the outside to the storage apparatus stops; a cache memory that retains data to be stored into the storage unit; and a nonvolatile memory into which the data retained in the cache memory is saved upon power failure; the control method comprising:

determining surplus power, based on capacitance of the capacitor, to be supplied by the power supply unit for saving of data into the nonvolatile memory is exceeded;

determining a first target voltage, based on elapsed time after fabrication of the power supply unit, that is a target in a charging process to the power supply unit based on the determined surplus power, and at which the power supply unit is capable of supplying power to the controller to save the data into the nonvolatile memory; and carrying out a charging process for the power supply unit with a first current value until the voltage charged in the power supply unit reaches the first target voltage and that carries out a charging process for the power supply unit with a second current value lower than the first current value until the voltage charged in the power supply unit reaches a second target voltage higher than the first target voltage from the first target voltage.

12. The control method according to claim 11, wherein a start-up process is carried out for the storage unit when the power supply unit is charged to the first target voltage.

13. The controlling method according to claim 11, wherein the power supply unit includes a capacitor that is charged by the charging process; and the storage apparatus further includes a retention unit that retains a capacitance and a resistance of the capacitor and fabrication date and time of the power supply unit;

wherein the determining of the surplus power is based on the capacitance and the resistance of the capacitor, retained in the retention unit; and wherein the elapsed time after fabrication of the power supply unit is based on the fabrication date and time retained in the retention unit.

14. The controlling method according to claim 11, further comprising saving the data retained in the cache memory into the nonvolatile memory upon power failure; and wherein the power supply unit supplies the power to the cache memory also after the saving is completed.

* * * * *